Oct. 16, 1934.  E. O. HULBURT  1,976,728
POLARIZATION PHOTOMETER
Filed Oct. 14, 1933  2 Sheets-Sheet 1
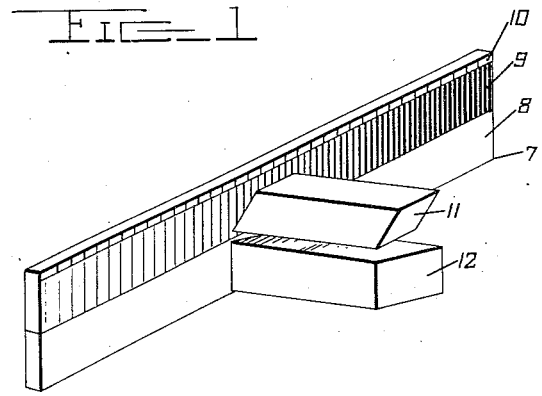
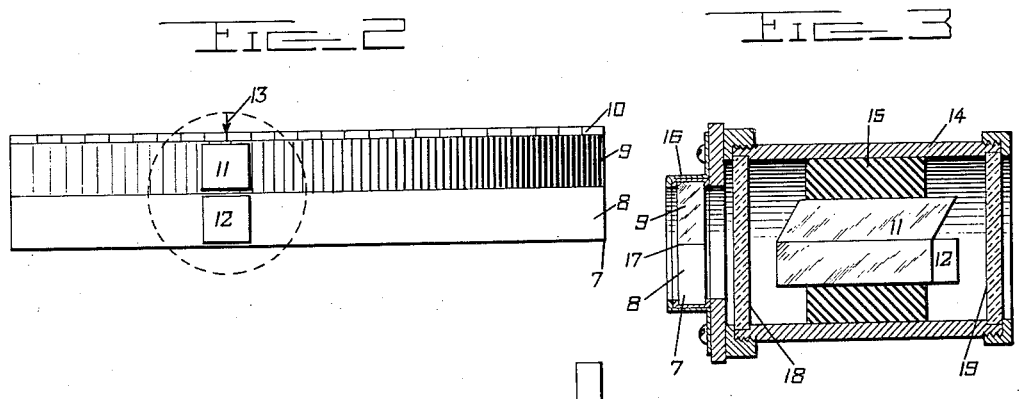
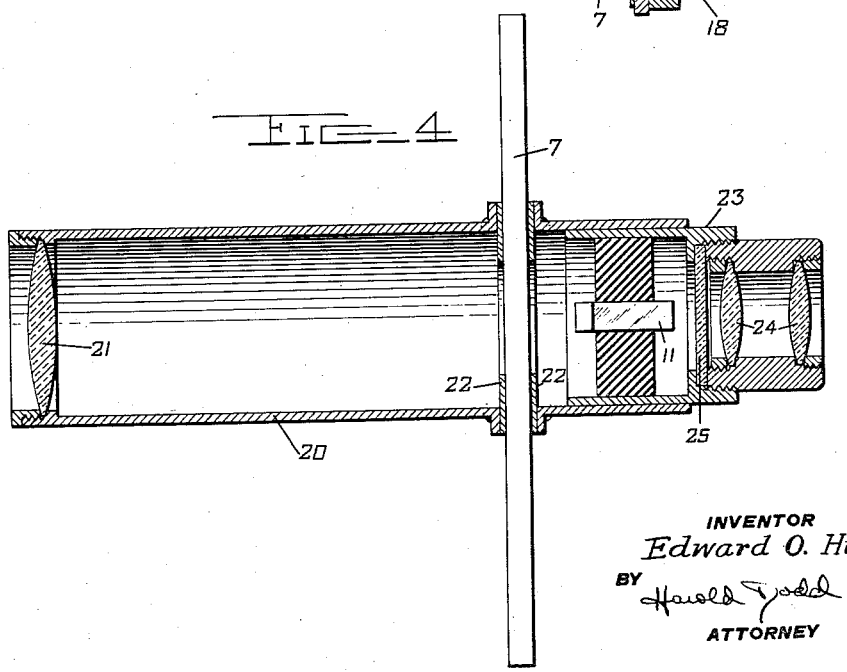
*INVENTOR*
*Edward O. Hulburt*
BY
*ATTORNEY*

Oct. 16, 1934. E. O. HULBURT 1,976,728
POLARIZATION PHOTOMETER
Filed Oct. 14, 1933. 2 Sheets-Sheet 2
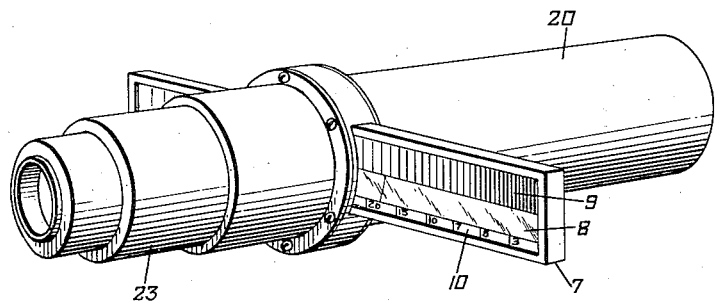
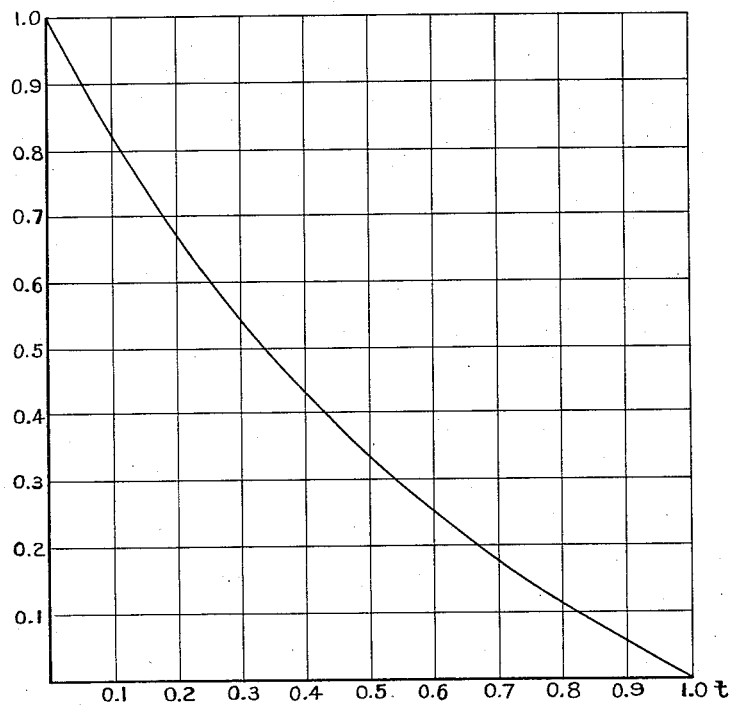
INVENTOR
Edward O. Hulburt
BY
ATTORNEY Patented Oct. 16, 1934

1,976,728

UNITED STATES PATENT OFFICE 1,976,728

POLARIZATION PHOTOMETER

Edward O. Hulburt, Washington, D. C.

Application October 14, 1933, Serial No. 693,553

6 Claims. (Cl. 88—23)

(Granted under the act of March 3, 1883, as amended April 30, 1928; 370 O. G. 757)

This invention relates to a device for measuring the percentage of plane polarized light in the total quantity of light emitted by a light source.

It is the object of this invention to provide a simple and readily portable instrument for measuring accurately the proportion of plane polarized light in any desired plane in the light given off from a source such as a star or from a selected portion of the sky, etc.

In the drawings:

Fig. 1 is a schematic perspective view of the essential parts of my invention;

Fig. 2 is a front elevational view of the same parts as shown in Fig. 1;

Fig. 3 is a vertical longitudinal sectional view of one embodiment of my invention;

Fig. 4 is a transverse longitudinal sectional view of my invention as incorporated in a telescope;

Fig. 5 is a perspective view of the device shown in Fig. 4;

Fig. 6 is a graph wherein the percentage of light transmitted through the optical wedge of my invention is plotted against the percentage of plane polarized light, in any given plane, emitted from the source being examined.

I am aware that the term "polarization photometer" has heretofore been applied to a certain type of instrument wherein Nicol prisms are used simply for varying by known amounts the intensity of the light transmitted. Such instruments are used in determining the intensity of light without regard to what percentage, if any, may be polarized and are, strictly speaking, more properly termed "polarizing photometers". The Nicol prisms are used merely because of their convenience in the respect above mentioned. The present invention, however, is exactly what the name implies, i. e., a photometer for measuring percentage of plane polarization.

As shown in Figs. 1 and 2, my invention consists essentially of an optical wedge 7 having a longitudinal band 8 that is transparent throughout its length and adjacent thereto a band 9 that uniformly increases in opacity from end to end, the left-hand end having substantially the same permeability to light as does the band 8, but being substantially completely opaque at the right-hand end. Along one side of the wedge is a scale 10 that may be calibrated either in terms of the percentage of light transmitted or in terms of the percentage of polarized light from the source being observed, which calibration is taken from the curve in Fig. 6.

Two Nicol prisms 11 and 12 are disposed in face-to-face contact with their longitudinal axes parallel, but with the planes of polarization of light transmitted thereby at right angles to each other, and are so positioned with respect to the optical wedge 7 that the dividing line between the bands 8 and 9 thereon lies in the plane defined by the contacting faces of prisms 11 and 12. The index 13 is disposed in the common longitudinal vertical plane of the axes of prisms 11 and 12 to indicate the point at which scale 10 is to be read. In the schematic illustrations of Figs. 1 and 2 the prisms are shown as slightly separated from each other, but it is to be understood that this is merely for the purpose of making clear their relation to the respective bands 8 and 9 on wedge 7.

Fig. 3 shows one form of my invention wherein the prisms 11 and 12 are mounted in a simple tube 14 by means of any suitable material such as a body 15 of rubber or the like. The wedge 7 is slidable in guides 16 secured to the tube 14 in such manner that the division line 17 between bands 8 and 9 is correctly positioned with respect to the contacting faces of the prisms. The interior of tube 14 is protected against dust and moisture by glass closure members 18 and 19, one or both of which may be color-filters.

Fig. 4 illustrates my invention included in a telescope having a tube 20 with oppositely disposed slots in the walls thereof in a position such that the focal plane of objective lens 21 lies between the guides 22 positioned against the walls of these slots within which guides the wedge 7 is slidable. The prisms 11 and 12 are mounted in eyepiece 23 which supports ocular lenses 24 and, if desired, a color-filter 25.

For certain purposes the band 9 of the wedge has been made of colloidal graphite in gelatin between glass plates which transmits about 94% of the light at the transparent end and about 3% at the dark end. Various other colors such as green, red and blue wedges have been used to make measurements with various colors of the spectrum.

The manner of using the instrument is as follows: If it is desired to measure the amount of plane polarized light coming from a particular region of the sky, the instrument is pointed toward that region and rotated about its longitudinal axis, which is parallel to the axes of the Nicol prisms, until prism 11 shows a maximum transmission and prism 12 a minimum transmission. Thus, if in Fig. 2 the wedge 7 were absent, the sky would appear brighter through prism 11 than through prism 12; the wedge 7 is slid along until the light transmitted through prism 11 is made of equal intensity with that through prism 12. For this adjustment let $i_{11}$ and $i_{12}$ be the intensities of the light transmitted through prisms 11 and 12; let the fraction of the light transmitted by the wedge at the point where the light through the two prisms is of equal intensity be $t$, and let $F$ be the fraction of the total light that is polarized. Then:

$$i_{11}t = i_{12} \qquad (1)$$

since the fields in the two prisms have been made of equal intensity.

If the light is composed of a mixture of plane polarized and non-polarized light, the fraction of the total light which is polarized in the plane being investigated is given by F, where:

$$F = \frac{i_{11} - i_{12}}{i_{11} + i_{12}} \tag{2}$$

Substituting (1) into (2) gives:

$$F = \frac{1-t}{1+t} \tag{3}$$

The fraction of light $t$, transmitted at each point along the band 9 of the wedge is measured by means of a spectrophotometer or any other suitable laboratory instrument. Equation (3) enables us to calculate the values of F from the measured values of $t$ and from these data the curve in Fig. 6 is drawn using the values of F as ordinates and the values of $t$ as abscissa. The particular graph shown in Fig. 6 was derived from a wedge that was gray and hence all colors were equally absorbed thereby. If the scale 10 be calibrated in terms of F, the values will be read directly therefrom.

If the source of light is plane polarized, or partially plane polarized, equally for all colors of the spectrum, the gray wedge mentioned above yields complete information about the state of polarization of the light. If, however, the source of light is unequally polarized for the various colors, one must separate out the various colors by means of color-filters, or by the use of a spectroscope, and measure the degree of polarization of each color separately.

The definition of F, as given by equation (3) is the correct one for the case of a mixture of plane polarized and non-polarized light. It is in common use; see, for example, Wood and Ellett, Physical Review, Vol. 24, page 249, Sept. 1924. It is hardly necessary to remark that the instrument is not suitable, without auxiliary apparatus, for the measurement of the polarized fraction of the light in the case of circularly or elliptically polarized light.

The invention described herein may be manufactured and used by or for the Government of the United States of America for governmental purposes, without the payment of any royalties therefor.

I claim:

1. An instrument of the type described, comprising a sighting tube, an objective lens and an eyepiece in the opposite ends thereof, said tube having opposed slots in its wall, a guide extending between said slots, the focal plane of said objective lying within said guide, two Nicol prisms mounted together in said eyepiece with their axes parallel to each other and to the axis of said tube and so oriented that the planes of polarized light transmitted thereby are at right angles to each other, and an optical wedge slidable in said guide, said wedge having a longitudinal transparent band of uniform light permeability and adjacent thereto a longitudinal band of substantially uniformly varying capacity from end to end, and a scale adjacent the second mentioned band to show the relative permeability of the two bands at various points, the light from said objective to one prism passing through one of said bands and to the other prism through the other of said bands.

2. An instrument of the type described, comprising a sighting tube, an objective lens and an eyepiece in the opposite ends thereof, said tube having opposed slots in its wall, a guide extending between said slots, the focal plane of said objective lying within said guide, two Nicol prisms mounted together in said eyepiece with their axes parallel to each other and to the axis of said tube and so oriented that the planes of polarized light transmitted thereby are at right angles to each other, and means to compare and indicate the relative intensities of light transmitted by the two prisms.

3. An instrument of the type described, comprising a sighting tube, an objective lens and an eye-piece in the opposite ends thereof, said tube having opposed slots in its wall, a guide extending between said slots, the focal plane of said objective lying within said guide, two Nicol prisms mounted together in said eyepiece with their axes parallel to each other and to the axis of said tube and so oriented that the planes of polarized light transmitted thereby are at right angles to each other, a light filter in the path of light passing through said prisms and means to compare and indicate the relative intensities of light transmitted by the two prisms.

4. An instrument of the type described, comprising a sighting tube, two Nicol prisms mounted together therein with their axes parallel to each other and to the axis of said tube and so oriented that the planes of polarized light transmitted thereby are at right angles to each other, a color filter in the path of light passing through said prisms, and an optical wedge also disposed in said path, said wedge having a longitudinal band of substantially uniform light permeability, adjacent thereto a band of substantially uniformly varying opacity from end to end, and a scale adjacent the second mentioned band to indicate the light transmission thereof at different points, the line between said bands lying substantially in the plane defined by the contacting surfaces of said prisms.

5. An instrument of the type described, comprising a sighting tube, two Nicol prisms mounted together therein with their axes parallel to each other and to the axis of said tube and so oriented that the planes of polarized light transmitted thereby are at right angles to each other, and an optical wedge also disposed in the path of light passing through said prisms, said wedge having a longitudinal band of substantially uniform light permeability, adjacent thereto a band of substantially uniformly varying opacity from end to end, and a scale adjacent the second mentioned band to indicate the light transmission thereof at different points, the line between said bands lying substantially in the plane defined by the contacting surfaces of said prisms.

6. An instrument of the type described, comprising a sighting tube, an objective lens and an eyepiece in the opposite ends thereof, said tube having opposed slots in its wall, a guide extending between said slots, the focal plane of said objective lying within said guide, two Nicol prisms mounted together in said eyepiece with their axes parallel to each other and to the axis of said tube and so oriented that the planes of polarized light transmitted thereby are at right angles to each other, and means to compare the relative intensities of light transmitted by the two prisms and to indicate the percentage of polarized light in the total light emanating from a source being observed.

EDWARD O. HULBURT.